United States Patent [19]
Endo et al.

[11] Patent Number: 5,546,220
[45] Date of Patent: Aug. 13, 1996

[54] OPTICAL WAVELENGTH CONVERTER WITH TEMPERATURE TUNING

[75] Inventors: Tetsuro Endo; Kiichiro Shinokura, both of Tendo, Japan

[73] Assignee: Tohoku Pioneer Electronic Corporation, Tendo, Japan

[21] Appl. No.: 386,494

[22] Filed: Feb. 10, 1995

[30]     Foreign Application Priority Data

Feb. 14, 1994  [JP]  Japan .................................. 6-017451

[51] Int. Cl.⁶ ..................................................... G02F 1/37
[52] U.S. Cl. ......................... 359/332; 359/328; 385/122
[58] Field of Search .............................. 359/326–332; 372/21–22; 385/122

[56]                References Cited

U.S. PATENT DOCUMENTS

| | | | |
|---|---|---|---|
| 5,029,976 | 7/1991 | Goto | 359/328 |
| 5,031,999 | 7/1991 | Harada et al. | 359/326 |
| 5,199,097 | 3/1993 | Shinokura et al. | 385/122 |

*Primary Examiner*—John D. Lee
*Attorney, Agent, or Firm*—Fish & Richardson P.C.

[57]              ABSTRACT

An optical wavelength converter includes an optical wavelength converting element having a multimode waveguide of a core of a nonlinear optical material with a high temperature dependency or temperature coefficient of an index difference for the fundamental wave and secondary harmonic and a clad surrounding the multimode waveguide for converting a wavelength of a fundamental wave entering the multimode waveguide to a ½ wavelength of a secondary harmonic; and a temperature tuning device for changing a temperature of the clad and the multimode waveguide within a predetermined temperature range to maintain a phase matching temperature of the fundamental wave and the secondary harmonic in the optical wavelength converting element. The temperature tuner changes the temperature coefficient so as to select a pertinent pair of the fundamental wave and secondary harmonic modes for a wavelength conversion. The multimode waveguide structure has a large sectional area which enables output of a stable high power of secondary harmonic and is easily manufactured.

6 Claims, 4 Drawing Sheets

FUNDAMENTAL WAVE
SECONDARY HARMONIC

FUNDAMENTAL WAVE
SECONDARY HARMONIC

OPTICAL WAVELENGTH CONVERTER WITH TEMPERATURE TUNING

BACKGROUND OF THE INVENTION

1. Field of the Invention

The present invention relates an optical wavelength converting device comprising a waveguide or core of a nonlinear optical material and a clad surrounding the core for converting a wavelength of a fundamental wave entering the waveguide to a ½ wavelength of a secondary harmonic, which utilizes the Second Harmonic Generation (SHG) in which the fundamental wave passing through the waveguide generates the secondary harmonic.

2. Description of the Related Art

There is an optical wavelength converter system of waveguide-type as shown in FIG. 1. This three-dimensional waveguide type wavelength converting converter 5 utilizes a semiconductor laser 1 as a light source for generating a fundamental wave as a light beam. The optical wavelength converter 5 comprises a core made of a nonlinear optical material and a clad substrate 3 surrounding the core. A converging lens 2 placed between the laser and the converter converges the fundamental wave beam into a rectangle end surface of the core which is an optical coupling portion. The converter 5 converts the wavelength of the fundamental wave to a ½ wavelength of secondary harmonic.

Conventional waveguide types of optical wavelength converting elements are generally classified into Cherenkov radiation type, Inverted domain type and Simple birefringence type. Almost all of the waveguide portions in these types are designed so as to satisfy single-mode guided conditions with respect to the fundamental wave as well as with respect to the secondary harmonic excepting the Cherenkov radiation type.

The single-mode waveguide has a small sectional area of the end surface and a small difference of refractive indexes between the waveguide and the substrate. An entering fundamental wave propagates with a single-mode in the waveguide. The electric susceptibility due to the secondary nonlinear optical effect of the nonlinear optical material generates a secondary harmonic, so that both the fundamental wave and secondary harmonic are mode-coupled and then the secondary harmonic is gradually converted into its single-mode.

In the conventional waveguide-type optical wavelength converters, a change of temperature and/or physical fluctuation in the optical coupling system propagating the fundamental wave changes a coupling rate of the fundamental wave, so that the output of the secondary harmonic is apt to be unstable. Since the sectional area of the waveguide is small, the power density of the injected fundamental wave becomes high, so that the waveguide may be broken due to the high power density. If the sectional area of the waveguide is expanded in order to obtain the single-mode condition, then an index difference between both the waveguide and substrate becomes very small, so that the difficulty of control and selection of materials of both the waveguide and substrate increases the complication in the production of the optical wavelength converter.

It is impossible to select the injected fundamental wave mode and only the single-mode of fundamental wave is used for the optical wavelength conversion. Therefore, the conventional optical wavelength converter outputs only a single transverse mode of secondary harmonic.

SUMMARY OF THE INVENTION

In view of the problem mentioned above, the present invention is executed to overcome the problem. An object of the present invention is to provide a practical optical wavelength converter comprising a waveguide-type optical wavelength converting element in which a desired transverse mode of secondary harmonic is obtained as an output. Another object of the present invention is to provide an optical wavelength converter for achieving a stable high output of secondary harmonic. A further object of the present invention is to provide an optical wavelength converter with a convenient production of the waveguide-type optical wavelength converting element. Another object of the present invention is to provide an optical wavelength converter for obtaining a high conversion efficiency with respect to high order modes in which both the input and output modes are variable.

An optical wavelength converter according to the present invention comprises:

an optical wavelength converting element having a multimode waveguide of a nonlinear optical material and a clad surrounding the multimode waveguide for converting a wavelength of a fundamental wave entering the multimode waveguide to a ½ wavelength of a secondary harmonic; and a temperature tuning device for changing a temperature of said clad and said multimode waveguide within a predetermined temperature range to maintain a phase matching temperature of said fundamental wave and said secondary harmonic in said optical wavelength converting element.

Another optical wavelength converter according to the present invention comprises:

an optical wavelength converting element having a waveguide core of a nonlinear optical material and a clad surrounding the core for converting a wavelength of a fundamental wave entering the core to a ½ wavelength of a secondary harmonic;

said waveguide core being a multimode waveguide having a plurality of guided modes;

a temperature tuning device for changing a temperature of said clad and said multimode waveguide within a predetermined temperature range to maintain a phase matching temperature of said fundamental wave and said secondary harmonic in said optical wavelength converting element; and said multimode waveguide have a temperature coefficient difference K between a temperature coefficient of an effective refractive index for a fundamental wave and a temperature coefficient of an effective refractive index for a secondary harmonic within said predetermined temperature range represented by the following formula, $$1\times10^{-3} > K = |\partial N_F/\partial T - \partial N_{SF}/\partial T| > 5\times10^{-5}$$

wherein $\partial N_F/\partial T$ denotes a temperature coefficient of an effective refractive index for a fundamental wave in said multimode waveguide, and $\partial N_{SF}/\partial T$ denotes a temperature coefficient of an effective refractive index for a secondary harmonic in said multimode waveguide.

The multimode waveguide made of a nonlinear optical material in the optical wavelength converting element has a high temperature dependency for an index difference with respect to a fundamental wave and a secondary harmonic. Namely the temperature coefficient difference K between a temperature coefficient of an effective refractive index for a fundamental wave and a temperature coefficient of an effective refractive index for a secondary harmonic is large as shown by the above formula, so that restrictions to a light source generating a fundamental wave and the designing of the waveguide are lightened. Since the temperature tuning device for controlling temperature of the multimode waveguide is provided with the above-converter, the phase matching is achieved in the mode dispersions of both the fundamental wave and secondary harmonic by changing the temperature of the multimode waveguide, so that the output secondary harmonic of the transverse mode is easily selected.

BRIEF DESCRIPTION OF THE DRAWINGS

The features of the present invention are set forth with particularity in the appended claims. The invention together with other objects and advantages thereof may be understood by reference to the following description of the presently preferred embodiments together with the accompanying drawings in which:

DETAILED DESCRIPTION OF THE PREFERRED EMBODIMENTS

Preferred embodiments according to the present invention will be described below referring to the accompanying drawings.

Figure 1:
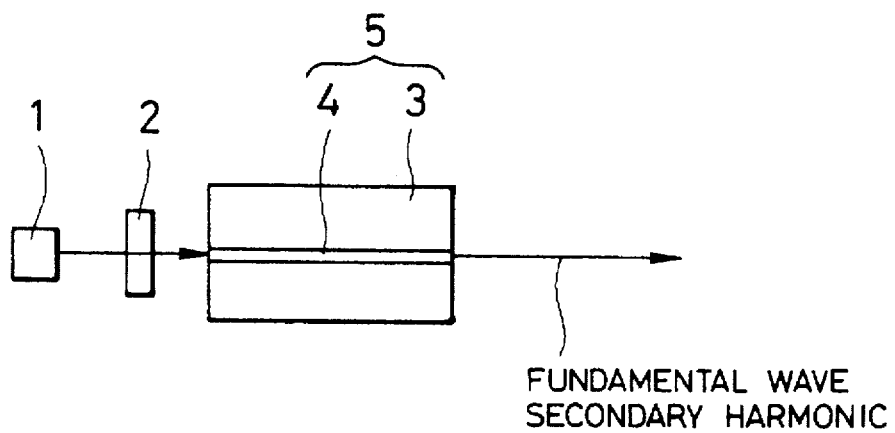
FIG. 1 is a schematic view of a device comprising an optical wavelength converting element having a single-mode waveguide.
Figure 2:
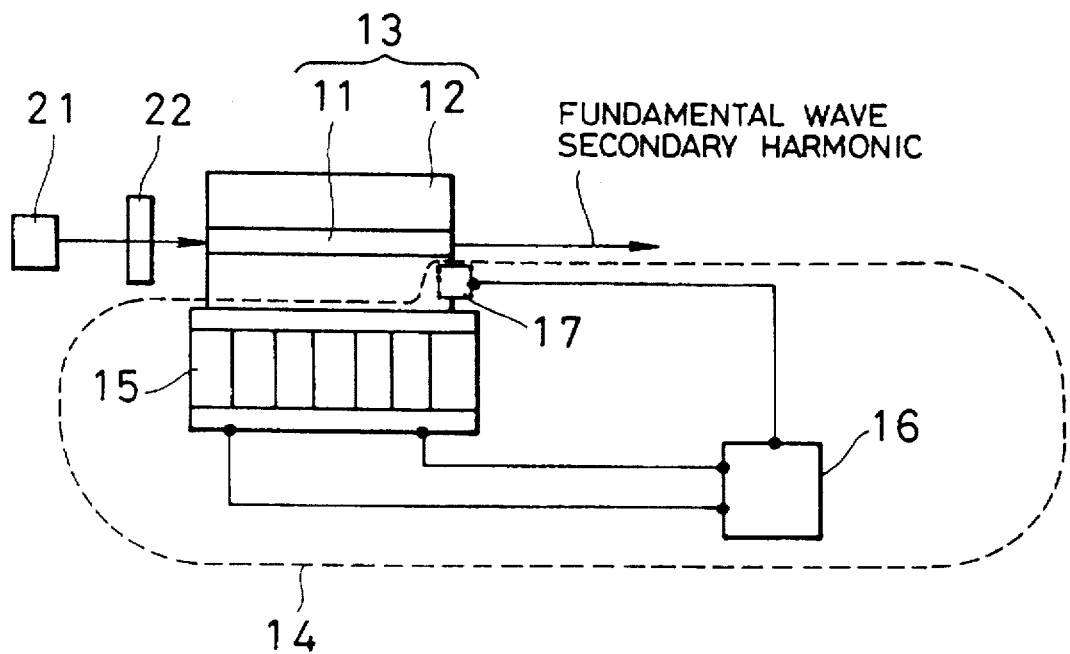
FIG. 2 is a schematic view of an optical wavelength converter according to the present invention comprising an optical wavelength converting element having a multimode waveguide and a temperature tuning device for controlling the temperature thereof.

FIG. 2 shows an optical wavelength converter according to one embodiment of the invention. This optical wavelength converter comprises a multimode waveguide type optical wavelength converting element 13 and a temperature tuning device 14 connected to the converting element. The multimode waveguide type optical wavelength converting element 13 is constructed with a core or multimode waveguide 11 made of a nonlinear optical material having a high temperature dependency for an index difference with respect to a fundamental wave and a secondary harmonic such as $KNbO_3$, and a clad substrate 12 surrounding the core. The temperature tuning device 14 changes a temperature of the clad and the multimode waveguide within a predetermined temperature range to maintain a phase matching temperature of the fundamental wave and the secondary harmonic in the optical wavelength converting element.

The multimode waveguide 13 receives a fundamental wave injected from a semiconductor laser 21 through a converging lens 22 at the end surface thereof and then generates a multimode secondary harmonic having a ½ wavelength of the fundamental wave.

The temperature tuning device 14 comprises a Peltier element 15 and a thermistor 17 connected to the multimode waveguide 13 respectively and a temperature controller 16 contacted to the Peltier element 15 and the thermistor 17. The Peltier element 15 heats or cools the multimode waveguide 11 through the substrate 12 within a temperature range of 15–25 degrees centigrade to keep the temperature constant within a range of plus or minus 0.1 centigrade degree. The temperature control is preformed by using the Peltier element 15 in this TE (Thermo-Electric) temperature tuning device in such a manner that the thermistor 17 detects temperature of the substrate to send a signal to the temperature controller 16 which provides electric currents to the Peltier element 15 in response to the signal. In case the Peltier element and the thermistor are used, there are so-called constant current and voltage methods as temperature measuring methods, the former is controlled to keep the voltage constant and the latter the current constant to the thermistor to adjust the temperature constant.

When the temperature tuning device 14 changes temperature of the multimode waveguide during the propagation of multimode fundamental wave so as to scan slowly (e.g., 0.05 degrees centigrade /sec.) with a precision of plus or minus 2 degrees centigrade at a temperature adjacent to a theoretical value calculated as a desired mode phase matching temperature, then the mode excitation is obtained so that the temperature for the highest output of secondary harmonic is selected. In this way, the temperature tuning device 14 can achieve the temperature controlling for a desired mode phase matching.

As shown in FIG. 2, the optical wavelength converting element 13 is arranged along the optical axis of the light source such as a semiconductor laser 21 and the converging optical system 22 for providing a fundamental wave to the element 13 in such a manner that the converging optical system 22 converges the fundamental wave to the input end surface of the optical wavelength converting element 13. Instead of these semiconductor laser 21 and converging optical system 22, the other combination of e.g., a variable wavelength laser may be used to obtained a desired wavelength and coupling mode of the fundamental wave.

The multimode waveguide of the optical wavelength converting element is made of a nonlinear optical material having a temperature coefficient difference K between a temperature coefficient of an effective refractive index for a fundamental wave and a temperature coefficient of an effective refractive index for a secondary harmonic, represented by the following formula, $$1\times10^{-3}>K=|\partial N_F/\partial T-\partial N_{SF}/\partial T|>5\times10^{-5}$$

wherein $\partial N_F/\partial T$ denotes a temperature coefficient of an effective refractive index for a fundamental wave in the multimode waveguide, and $\partial N_{SF}/\partial T$ denotes a temperature coefficient of an effective refractive index for a secondary harmonic in the multimode waveguide. An example of nonlinear optical material such as $KNbO_3$ has $K=1.72\times10^{-4}$ at a bulk.

In this way, the optical wavelength converter of this embodiment has the multimode waveguide made of a nonlinear optical material having a temperature coefficient difference corresponding to its temperature dependency K higher than $5\times10^{-5}$/centigrade degree and therefore, the multimode waveguide may have a sectional area larger than that of the single-mode waveguide and a large index difference between the clad substrate and core in its refractive indexes. The temperature tuning device controls the temperature of the multimode waveguide to select the transverse mode of the output secondary harmonic.

Inventors have studied the temperature dependency coefficient or temperature coefficient difference K corresponding to the index difference between the fundamental wave and secondary harmonic through a plurality of experiences and reveal the relationship between a change of temperature and the refractive index in a multimode waveguide as described below, so that phase matching is achieved by the temperature controlling of the multimode waveguide.

First, in view of the crystalline axis of multimode waveguide, each refractive index $n(\lambda)$ of a nonlinear optical material with respect to fundamental wave and secondary harmonic is calculated by utilizing Sellmeier's equation for approximating wavelength dispersion of refractive index represented below;

$$n(\lambda)^2 = 1 + \Sigma(A_i \lambda^2)/(\lambda^2 - \lambda_i^2)$$

wherein $\lambda$ denotes a wavelength of a fundamental wave or secondary harmonic, $\lambda_i$ denotes a wavelength corresponding to a characteristic frequency of the nonlinear optical material and $A_i$ ($i=1,2,3 \ldots$) denotes its corresponding constant. The $\lambda_i$ and $A_i$ change according to the materials. The approximation by the third item ($i=1,2$) is sufficient.

By introducing the resultant refractive indexes for the fundamental wave and secondary harmonic into an empiric equation showing a relation between refractive index and temperature, represented below, refractive indexes $n(t)$ of the nonlinear optical material for the fundamental wave and secondary harmonic are obtained respectively.

$$n(t) = n_0 + Ca(t - t_0)$$

In this equation, $t$ denotes temperature, $t_0$ denotes a reference temperature under the condition of Sellmeier's equation, $n_0$ denotes the refractive index resulted by Sellmeier's equation at the reference temperature, and Ca denotes a constant which changes according to the multimode waveguide material. The above empiric equation is established by Inventors through many experiences performed in view of the constant Ca corresponding to the crystalline axis of multimode waveguide.

By introducing the resultant refractive indexes for the fundamental wave and secondary harmonic into Marcatili method (E. A. J. Marcatili, "Dielectric Rectangular Waveguide and Directional Coupler for Integrated Optics", The bell system technical journal, Vol.48, pp 2071–2102, September 1969), effective refractive indexes $N_F$ and $N_{SF}$ of the predetermined multimode waveguide made of nonlinear optical material for the fundamental wave and secondary harmonic are obtained respectively, and then multimode dispersion curves are plotted by using the effective refractive index and temperature as parameters.

By analyzing the multimode dispersion curves, a temperature coefficient $\partial N_F/\partial T$ of an effective refractive index for a fundamental wave and a temperature coefficient $\partial N_{SF}/\partial T$ of an effective refractive index for a secondary harmonic in the multimode waveguide are obtained. As a result, when the difference K between $\partial N_{SF}/\partial T$ and $\partial N_F/\partial T$ is large in the multimode dispersion curves and further the mode orders both of the fundamental wave and secondary harmonic are different from each other, the controlling of temperature of multimode waveguide enables the phase matching of fundamental wave and secondary harmonic.

As a result from experiments, to be is found it preferable that the nonlinear optical material used for a waveguide of the converting element has temperature coefficient difference K of $\partial N_{SF}/\partial T$ and $\partial N_{SF}/\partial T$ of more than $5 \times 10^{-5}$/centigrade degree. Therefore, the present invention utilizes the multimode dispersion of the multimode waveguide depending on its temperature controlled so as to achieve phase matching.

Generally, the design of symmetrical or asymmetrical three-dimensional waveguides utilizes the above Marcatili method or an equivalent refractive index method in which a normalized frequency V, a normalized waveguide refractive index, an asymmetrical standard $(n_1^2 - n_3^2)/(n_2^2 - n_1^2)$ and etc. are provided and then, the single-mode or a multimode waveguide is formed in view of the cutoff of the waveguide mode.

Figure 3A:
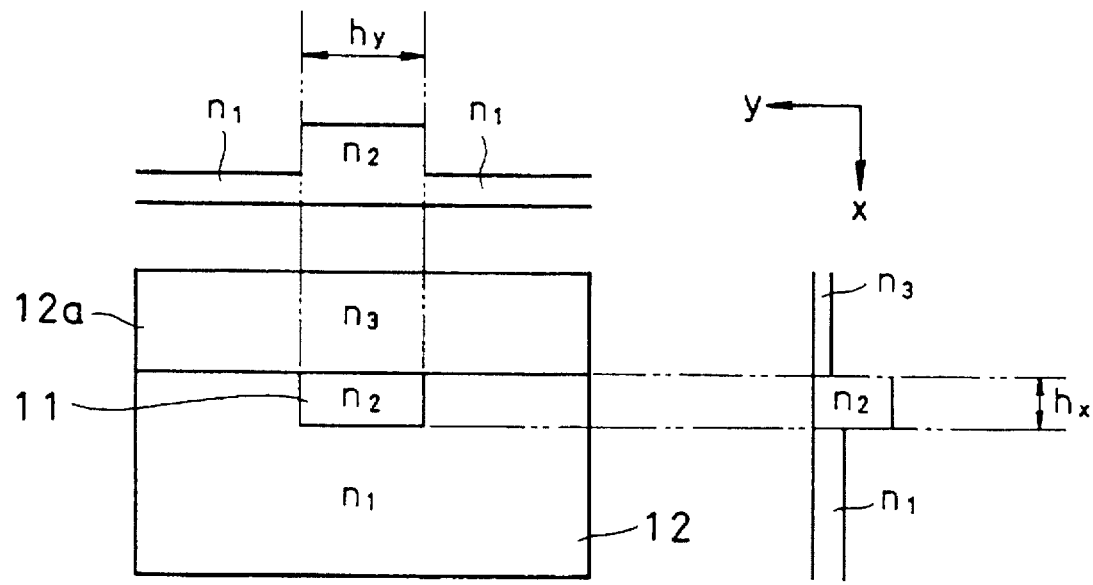
FIGS. 3A and 3B are sectional views of multimode waveguides of optical wavelength converting elements according to the present invention, seen from the end surfaces thereof.

For example, a step type three-dimensional waveguide consists of a clad substrate 12, a core 11 implanted therein and a clad 12a formed on the core as shown in FIG. 3A which has step distributions of refractive index in the depth x and wide y directions (right and top in the figure) respectively. In case that such a step type waveguide is designed by using an equivalent refractive index method, assuming that refractive indexes of the clad substrate, the core and the clad are $n_1$, $n_2$ and $n_3$ respectively ($n_2 > n_1 > n_3$) with respect to a light beam with a wavelength $\lambda$ in the depth x direction of the waveguide, then $V_0$, $V_m$ and V are obtained from the following formulas;

$$V_0 = \tan^{-1} \sqrt{(n_1^2 - n_3^2)/(n_2^2 - n_1^2)}$$

$$V_m = V_0 + m\pi$$

$$V = kh \sqrt{n_2^2 - n_1^2} = (2\pi/\lambda)h \sqrt{n_2^2 - n_1^2}$$

wherein V denotes a normalized frequency to be a target, m denotes integer of mode order, $V_m$ denotes a normalized frequency in the m order mode, $V_0$ denotes a normalized frequency in the 0 order mode, h denotes a depth or wide confining the light beam, and k denotes the propagation constant.

In case of the cutoff of waveguide, when the normalized frequency V is in the range of $V_m < V < V_{m+1}$, then the $TE_0$-$TE_m$ modes or the m+1 mode light beams propagate in the waveguide. Similarly, TH mode light beams are obtained.

The conventional designing of a step-type single-mode waveguide for a secondary harmonic requires a normalized frequency V selected in the range of $V_0 < V < V_1$. Since $n_1$ does not equal $n_3$ in the depth x direction and $n_1$ equals $n_3$ in the wide y direction, the waveguide is formed so as to satisfy the single-mode conditions as follows;

$$V_0 < (2\pi/\lambda_{SH})h_x \sqrt{n_2^2 - n_1^2} < V_0 + \pi$$

$$0 < (2\pi/\lambda_{SH})h_y \sqrt{n_2^2 - n_1^2} < \pi$$

wherein $\lambda_{SH}$ denotes a wavelength of secondary harmonic, $h_x$ denotes a depth of the core and $h_y$ denotes a wide of the core.

On the other hand, a step type multimode waveguide of the present invention is formed under the condition that the mode order m is in m>0 and then, the three-dimensional waveguide is formed so as to satisfy the following formula;

$$V_0 + \pi < (2\pi/\lambda_F)h_x \sqrt{n_2^2 - n_1^2}$$

$$\pi < (2\pi/\lambda_F)h_y \sqrt{n_2^2 - n_1^2}$$

wherein $\lambda_F$ denotes a wavelength of fundamental wave.

Although the sizes of the depth $h_x$ and width $h_y$ are provided, at least one of the sizes of the depth $h_x$ and wide $h_y$ may be met to the following formula in order to apply to a plurality of modes of fundamental wave.

$$\pi < (2\pi/\lambda_F)h \sqrt{n_2^2 - n_1^2}$$

Since $\lambda_{SH} < \lambda_F$, the multimode dispersion of secondary harmonic is obtained in status of the multimode of fundamental wave. In this way, the formation of a multimode waveguide of the present invention is not difficult in comparison with the single-mode waveguide designing.

Figure 3B:
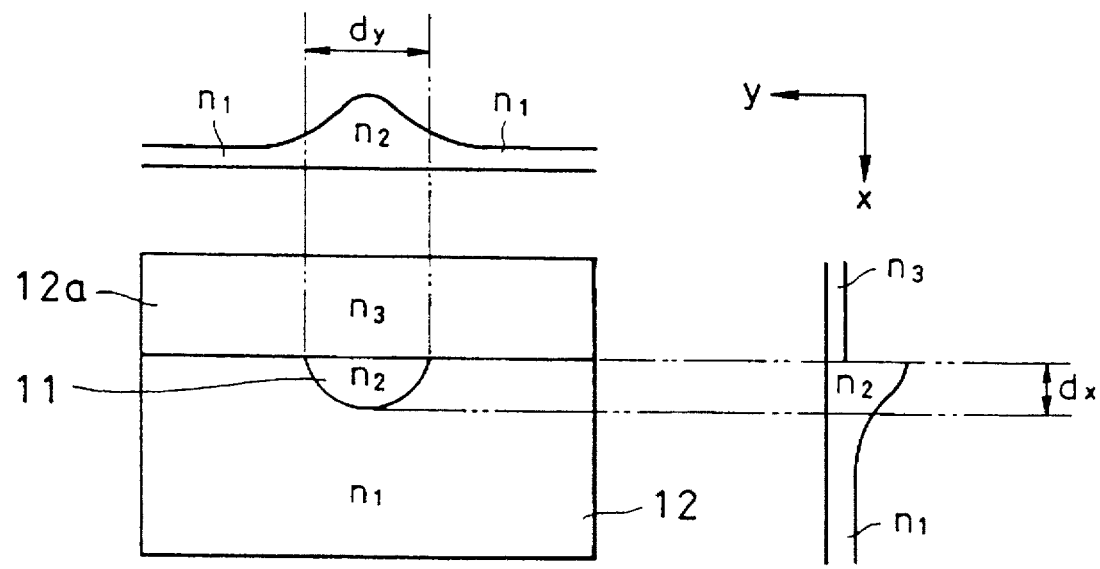

In addition, a graded-type multimode waveguide comprises a clad substrate 12, a core 11 implanted therein and a clad 12a formed on the core as shown in FIG. 3B and has Gaussian distributions of refractive index in the depth x and wide y directions respectively (right and top in the figure). Similarly above, a graded-type multimode waveguide of the present invention is formed under the condition that the mode order m is in m>0 and then, the three-dimensional waveguide is formed so as to satisfy the following formula;

$$\frac{7\sqrt{2}}{4} \sqrt{\pi} < (2\pi/\lambda_F)d_x \sqrt{n_2^2 - n_1^2}$$

$$\frac{3}{2} \sqrt{\frac{\pi}{2}} < (2\pi/\lambda_F)d_y \sqrt{n_2^2 - n_1^2}$$

wherein $\lambda_{SH}$ denotes a wavelength of secondary harmonic, $d_x$ denotes a depth of the core and $d_y$ denotes a width of the core. In order to apply to a plurality of modes of fundamental wave, at least one of the sizes of the depth $d_x$ and wide $d_y$ may be met to the following formula;

$$\frac{3}{2} \sqrt{\frac{\pi}{2}} < (2\pi/\lambda_F)d \sqrt{n_2^2 - n_1^2}$$

Concretely, an optical wavelength converter was manufactured as follows:

A multimode waveguide was made of $KNbO_3$ crystal ($n_2$=2.277; optical constant=$d_{32}$; sectional area of 7 micrometer square in the crystalline direction of 90 angle degree phase matching; length=8 mm) in an optical glass substrate ($n_1$=$n_3$), and then the substrate was coated with a resin ($n_1$=$n_3$=1.50 (at 860 nm), $n_1$=$n_3$=1.55 (at 430 nm)). Both end surfaces of the multimode waveguide were ground and polished to make an optical wavelength converting element. This wavelength converting element was adhered onto a temperature tuning device such as a Peltier element which is capable of changing temperature of the element of multimode waveguide within a predetermined temperature range. The wavelength converting element with the Peltier element is set in an input and output optical system with the same light source, thermistor and controller as shown in FIG. 2 to make an optical wavelength converter.

The light source was a semiconductor laser emitting a stable light beam with a wavelength of 860 nm. The coupling mode to the waveguide was adjusted the single-mode with a convergence angle adjuster. The propagation mode of fundamental wave was determined by the state of spatial mode of the injected light beam and the wave face on the input end surface of the waveguide, the size of the core, and the refractive indexes of the core and clad.

When the Peltier element control was operated to control the temperature of the waveguide within 15–25 degrees centigrade, $TE_{11}$ (single), $TE_{21}$, $TE_{12}$, $TE_{31}$, and $TE_{22}$ modes of secondary harmonic was subsequently obtained on a screen. The output power of secondary harmonic at $TE_{11}$ mode was 3.5 mW for the input power 80 mW immediately before the waveguide.

Figure 4:
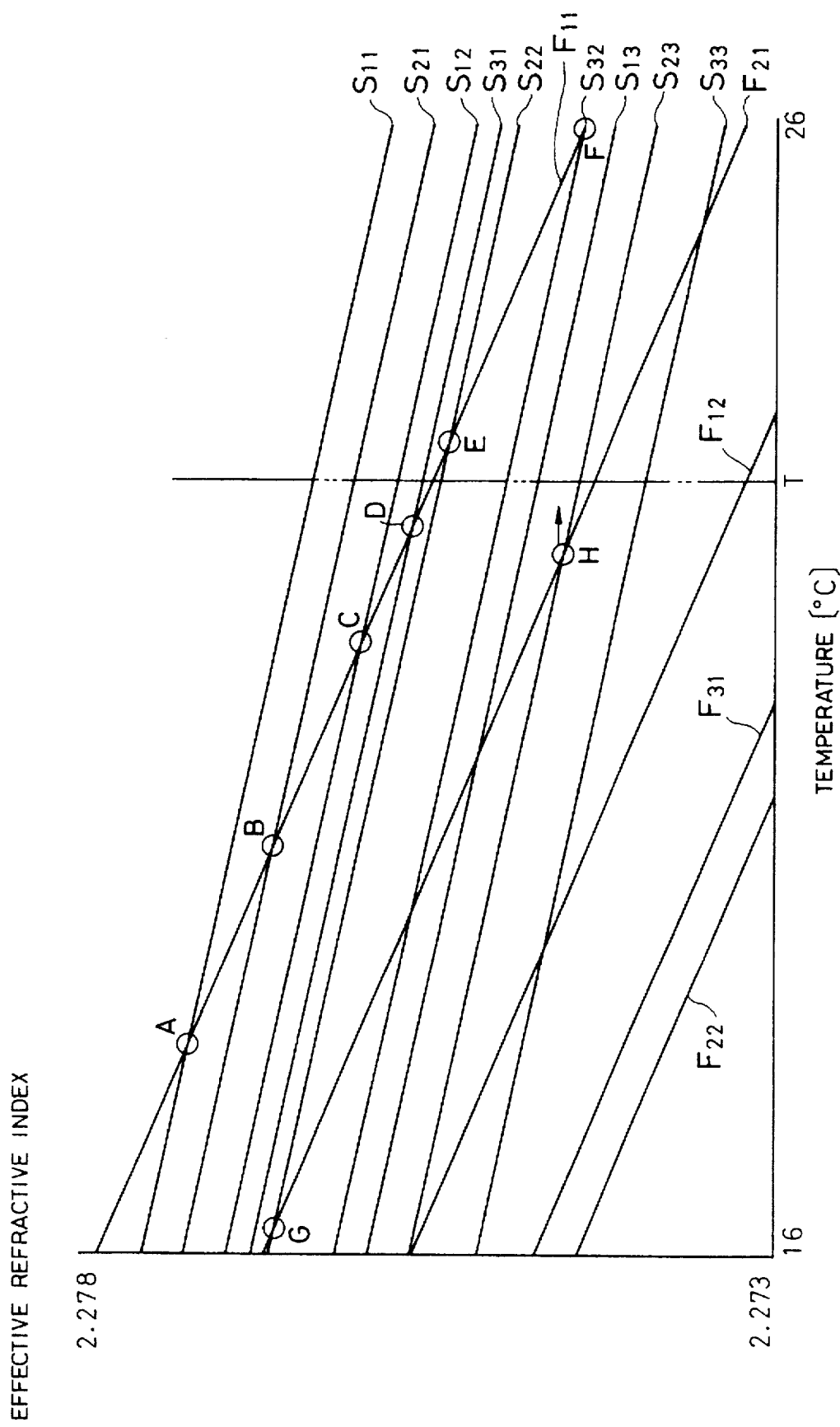
FIG. 4 presents a graph of mode dispersion curves showing the effective refractive index vs. the temperature of the multimode waveguide in the optical wavelength converting element according to the present invention.

FIG. 4 presents a graph of mode dispersion curves showing the effective refractive index vs. the temperature of the multimode waveguide in the optical wavelength converter of the embodiment mentioned above. The horizontal axis shows the waveguide temperature and the vertical axis shows the effective refractive index of the waveguide effective refractive index. Curves $S_{11}$–$S_{33}$ represent TE modes of secondary harmonic and curves $F_{11}$–$F_{31}$ represent TM modes of fundamental wave. Cross points of TE modes of secondary harmonic curves and TM modes of fundamental wave curves indicate phase matching points in the simple birefringence type multimode waveguide. It was found that mode excitations of secondary harmonic occur at the temperatures corresponding to such phase matching points.

As seen from FIG. 4, for example, when a fundamental wave of $F_{11}$ mode propagates, phase matching points (A, B, C, D, E, F) are obtained with secondary harmonic modes of $S_{11}$, $S_{21}$, $S_{12}$, $S_{31}$, $S_{22}$ and $S_{33}$ in the temperature range of 16–26 centigrade degree.

Since this waveguide has a phase matching temperature about 0.2 centigrade degree per wavelength 0.2 nm, the temperature controlling of the waveguide may be preformed with a rate of temperature plus or minus 0.1 centigrade degree adjacent to the phase matching points. The interval between the adjacent phase matching points is more than 1 centigrade degree. Therefore, the adjacent modes are surely separated. The upper limit of index difference of the temperature dependency of the nonlinear optical material with respect to the fundamental wave and secondary harmonic is determined due to such an interval of points. It is preferable that the upper limit of temperature coefficient difference is $K > 1 \times 10^{-3}$/centigrade degree for a precise mode separation.

The optical wavelength converter according to the present invention is capable of projecting a secondary harmonic of a single-mode and alternatively various modes of a secondary harmonic by temperature controlling of the multimode waveguide.

Furthermore, when the high-order-mode fundamental wave is mode-coupled to the high-order-mode secondary harmonic, the selection of the secondary harmonic output is possible to obtain a high output power in accordance with a suitable mode selection.

The optical nonlinear material $KNbO_3$, preferable as a bulk element for secondary harmonic of single transverse mode, is not practical for use in a waveguide type wavelength converting element because of difficulty of formation of its single-mode waveguide. However, the present invention achieves the use of $KNbO_3$ for a multimode waveguide in the wavelength converter to obtain a high output power of secondary harmonic by means of the temperature controlling to adjust the phase matching of the fundamental wave and secondary harmonic. The optical wavelength converter further enables the selective mode excitation of the transverse mode secondary harmonic to output secondary harmonic of an optional order mode including a low order mode at a high efficiency.

Although the temperature controlling of the waveguide is effective for the selection of the output mode of secondary harmonic, the change of the guided mode of fundamental wave generally results in the shift of the phase matching temperature. To preventing such a shift, the guided mode of fundamental wave is apt to be fixed by one in the conventional technique. However the wavelength converter of the present invention does not need to keep only one of the guided mode of fundamental wave. This is because the injected fundamental wave is coupled to the multimode waveguide with at least one of coupling conditions of the optical coupling system without a restriction of the guided mode of fundamental wave.

In case to obtain a desired mode secondary harmonic at a further high efficiency, a pair of fundamental wave and secondary harmonic modes each having similar electric field distributions to each other are preferably selected because the overlap integral of their electric field becomes large.

For example, in FIG. 4, when $S_{22}$ mode output is expected, $F_{11}$ mode is selected at about 23.2 degrees centigrade for phase matching point (E), alternatively $F_{21}$ is selected at about 16.3 degrees centigrade for phase matching point (G). The selection of $F_{21}$ is better than $F_{11}$ to increase the converting efficiency two times or more larger than $F_{11}$.

There are two methods for selecting the fundamental wave mode.

The first method is to form a multimode waveguide to which only a fundamental wave propagates at a single-mode. This method is effective for the outputs of $S_{11}$, $S_{31}$ and $S_{13}$ modes with a high efficiency. Although the multimode waveguide uselessly radiates further high order modes of secondary harmonic, low order modes of secondary harmonic are obtained at a high efficiency. There is a merit of formation of a large sectional area of the multimode waveguide as mentioned below.

The second method is to form a multimode waveguide to which both the fundamental wave and secondary harmonic propagate at sufficient multimode and then set the converging optical system for the fundamental wave to couple to the multimode waveguide at a desired guided mode for fundamental wave. Generally, a fundamental wave propagating in a waveguide has a reflection angle to the boundary of the waveguide and the substrate according to its guided mode. Therefore, the incident angle of converged laser beam at the end surface of the waveguide is adjusted by means of the converging optical system, so that the guided mode of the fundamental wave and secondary harmonic are optionally determined within the cutoff mode order of the waveguide to obtain a further higher order mode of secondary harmonic.

The present invention provides a multimode waveguide for a high order mode even if the secondary harmonic output should be a low order mode. The invention therefore allows the sectional area of the waveguide to be increased, so that the operation of the optical wavelength converting element becomes remarkably stable. This is because the expanded sectional area of the waveguide supports to reduce the change of the fundamental wave power coupled thereto even if the optical axis of fundamental wave or beam waist is shifted more or less. In other words, the present invention suppresses the fluctuation of the coupling rate of fundamental wave caused by a physical or thermal change of the optical coupling system to output a stable desired order mode of secondary harmonic.

Generally, an optical wavelength conversion efficiency of secondary harmonic is in proportion to a density of input power of fundamental wave. The input power decreases when a converted portion to a secondary harmonic conversion efficiency exceeds a threshold value. If a high output power is expected, a high input power will be needed.

The inorganic nonlinear optical material has a resistance of optical damage by a few Giga W/cm$^2$, and the organic material has the optical resistance strength by a few Mega W/cm$^2$, particularly, about $1/1000$ of these values is a practical resistance limit of optical damage. In view of the practical optical resistance, a waveguide having an optical resistance strength of a few Mega W/cm$^2$ needs a core sectional area of more than 50 micrometer square.

In contrast, the present invention allows formation of a waveguide with a large core sectional area not only 50 micrometer square or more but also 100 micrometer square or more to achieve a single-mode of secondary harmonic.

It is necessary for a high output power and stability of the converter to form a waveguide having a large core sectional area of a waveguide. However, it is difficult to manufacture such a waveguide having a core sectional area 50 micrometer square or more using conventional techniques, because such techniques require a fine controlling of an index difference between the core and clad with very fine precision.

In contrast, the present invention accepts a large index difference between the core and clad e.g., 1 in the waveguide but does not need such a fine controlling of index difference. The multimode waveguide of the present invention is easily formed in comparison with a single-mode waveguide.

In addition to the above embodiment having a simple waveguide of an optical nonlinear material, the present invention is applied to a quasi-phase matching (QPM) type SHG element.

Figure 5:
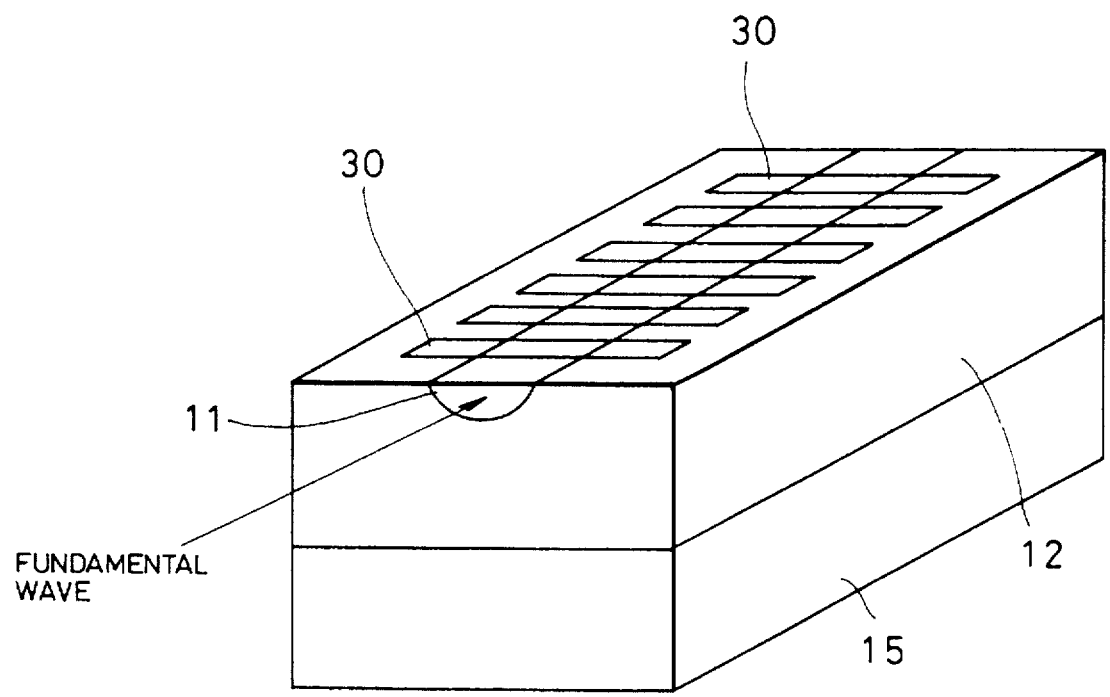
FIG. 5 is a perspective view showing a QPM type SHG element with a multimode waveguide according to the present invention.

FIG. 5 shows a multimode waveguide SHG element of such a QPM type which comprises: a substrate 12 made of a nonlinear optical material with a high temperature dependency or temperature coefficient K of an index difference for the fundamental wave and secondary harmonic; a multimode waveguide 11 formed on the substrate by a proton exchange method for example; and a plurality of periodic domain inverting portions 30 each extending perpendicular to the waveguide and formed on the substrate.

Phase velocity in the waveguide is determined by both the refractive index of its material and the size of the waveguide. In case of using a material with the temperature dependency of an index difference of the fundamental wave and secondary harmonic for the waveguide, not only the selection of phase velocity is achieved by the temperature controlling, but also the difference of phase velocity between the fundamental wave and secondary harmonic is. The above multimode waveguide QPM SHG element utilizes the multimode dispersion to select a predetermined mode. Namely, when the wavelength of fundamental wave is determined and the phase matching of the fundamental wave and secondary harmonic at a predetermined temperature is selected, then a pair of the fundamental wave and secondary harmonic modes are surely obtained.

In addition, as another embodiment, the present invention utilizes the refractive index dispersion (structural dispersion) of a nonlinear optical material of multimode waveguide in such a manner that while the temperature tuning device keeps the temperature of the waveguide constant, the selection of output mode is performed by changing the wavelength of fundamental wave injected to the waveguide.

For example, instead of the semiconductor laser in which the wavelength of emitted laser beam is fixed, e.g., 860 nm in the embodiment shown in FIG. 4, another laser element is used in which its wavelength is variable adjacent to 860 nm. In this case of changing of wavelength of fundamental wave, two groups of lines S and H in FIG. 4 move gradually upward at different speeds each other as the waveguide of fundamental wave gradually becomes short. In the embodiment of the multimode waveguide of KNbO$_3$, the group of S lines move upward faster than the group of F lines in the graph of FIG. 4, Therefore, all phase matching points e.g., A–H shift right-ward. As seen from FIG. 4, since the temperature tuning device keeps the temperature constant (line T), the prior phase-matched mode is not phase-matched and a next cross point move from left to right in turn and then the cross point of lines S and H coincides with the predetermined temperature (line T) so that a secondary harmonic mode excitation occurs.

Unless a nonlinear optical material has a temperature dependency of index difference, lines S and F become parallel to each other without any cross point. If a phase matching is performed, all lines S and F will overlap. In this case, it is necessary to change the wavelength of fundamental wave with a very wide range e.g., a few 10 nm–100 nm or more, so that the phase matching is impossible by changing the wavelength of fundamental wave injected to the waveguide.

On the other hand, the present invention comprises the multimode waveguide made of a nonlinear optical material with a high temperature dependency or temperature coefficient K of an index difference for the fundamental wave and secondary harmonic, the mode selection therefore is preformed by changing the wavelength of fundamental wave with a few nm order.

Furthermore, as another embodiment, the present invention utilizes both the controllings of the temperature of the waveguide and the wavelength of fundamental wave to be injected to the multimode waveguide to select optionally a desirable mode secondary harmonic.

There are methods for controlling the wavelength of fundamental wave such as, to changing an incident angle of fundamental wave to the end surface of multimode waveguide by a prism or grating inserted between the laser source and the waveguide to change the coupling mode of fundamental wave to the multimode waveguide;

to change wavelength of fundamental wave by a birefringence filter or etalons placed in the optical path of the laser element; and to change wavelength of fundamental wave by changing the deriving temperature or current to be applied to a semiconductor laser as a light source.

In this way, the present invention provides a multimode waveguide made of a nonlinear optical material with a high temperature dependency or temperature coefficient K of an index difference for the fundamental wave and secondary harmonic and a temperature tuner for changing the temperature coefficient K so as to select a pertinent pair of the fundamental wave and secondary harmonic modes for a wavelength conversion. Therefore, one of various modes of secondary harmonic including a single-mode are obtained at a high efficiency.

Furthermore, the multimode waveguide structure having a large sectional area enables to output a stable high power of secondary harmonic and is easily manufactured because of acceptation of a large index difference between the core and clad substrate.

What is claimed is:

1. An optical wavelength converter comprising:

an optical wavelength converting element having a multimode waveguide made of a nonlinear optical material having a plurality of guided modes and a clad surrounding the multimode waveguide for converting a wavelength of a fundamental wave entering the multimode waveguide to a ½ wavelength of a secondary harmonic;

a light source for emitting a light beam as a fundamental wave;

a converging optical system for providing said fundamental wave to said multimode waveguide and adjusting a coupling mode of said fundamental wave to a single mode in such a manner that the converging optical system converges the fundamental wave to an input end surface of said multimode waveguide; and a temperature tuning device for changing a temperature of said clad and said multimode waveguide within a predetermined temperature range to maintain a phase matching temperature of said fundamental wave and said secondary harmonic in said optical wavelength converting element.

2. An optical wavelength converter according to claim 1, wherein said converging optical system includes a convergence angle adjuster inserted between the light source and the waveguide on the end surface of the multimode waveguide so as to change the coupling mode of the fundamental wave to the multimode waveguide.

3. An optical wavelength converter comprising:

an optical wavelength converting element having a multimode waveguide core of a nonlinear optical material having a plurality of guided modes and a clad surrounding the core for converting a wavelength of a fundamental wave entering the core to a ½ wavelength of a secondary harmonic;

a light source for emitting a light beam as a fundamental wave;

a converging optical system for providing said fundamental wave to said multimode waveguide and adjusting a coupling mode of said fundamental wave to a single mode in such a manner that the converging optical system converges the fundamental wave to an input end surface of said multimode waveguide; and a temperature tuning device for changing a temperature of said clad and said multimode waveguide within a predetermined temperature range to maintain a phase matching temperature of said fundamental wave and said secondary harmonic in said optical wavelength converting element;

wherein said converging optical system and said temperature tuning device allow selection of one from a plurality of secondary harmonics as an output of the multimode waveguide; and wherein said multimode waveguide has a temperature coefficient difference K between a temperature coefficient of an effective refractive index for a fundamental wave and a temperature coefficient of an effective refractive index for a secondary harmonic within said predetermined temperature range represented by the following formula, $$1 \times 10^{-3} > K = |\partial N_F/\partial T - \partial N_{SF}/\partial T| > 5 \times 10^{-5}$$

wherein $\partial N_F/\partial T$ denotes a temperature coefficient of an effective refractive index for a fundamental wave in said multimode waveguide, and $\partial N_{SF}/\partial T$ denotes a temperature coefficient of an effective refractive index for a secondary harmonic in said multimode waveguide.

4. An optical wavelength converter according to claim 3, wherein said multimode waveguide is of a graded type waveguide satisfying a formula below;

$$\frac{3}{2} \sqrt{\frac{\pi}{2}} < (2\pi/\lambda_F)d_y \sqrt{n_2^2 - n_1^2}$$

wherein $d_y$ denotes a width or depth of said waveguide, $\lambda_F$ denotes a wavelength of the fundamental wave, $n_1$ denotes a refractive index of the clad for the fundamental wave, and $n_2$ denotes a refractive index of the core for the fundamental wave.

5. An optical wavelength converter according to claim 3, wherein said multimode waveguide is of a step type waveguide satisfying a formula below;

$$\pi < (2\pi/\lambda_F)h \sqrt{n_2^2 - n_1^2}$$

wherein h denotes a width or depth of said waveguide, $\lambda_F$ denotes a wavelength of the fundamental wave, $n_1$ denotes a refractive index of the clad for the fundamental wave, and $n_2$ denotes a refractive index of the core for the fundamental wave.

6. An optical wavelength converter according to claim 3, wherein said converging optical system includes a convergence angle adjuster inserted between the light source and the waveguide on the end surface of the multimode waveguide so as to change the coupling mode of the fundamental wave to the multimode waveguide.

* * * * *

UNITED STATES PATENT AND TRADEMARK OFFICE
CERTIFICATE OF CORRECTION

PATENT NO. : 5,546,220
DATED : August 13, 1996
INVENTOR(S) : Tetsuro Endo; Kiichiro Shinokura It is certified that error appears in the above-indentified patent and that said Letters Patent is hereby corrected as shown below:

Column 5, line 64; replace the first occurrance of "$\partial N_{SF}/\partial T$" with --$\partial N_F/\partial T$--.

Column 6, line 3; after "experiments," replace the words "to be" with --it--.

Column 6, line 3; after "found" replace the word "it" with --to be--.

Column 6, line 6; replace the first occurrance of "$\partial N_{SF}/\partial T$" with --$\partial N_F/\partial T$--.

Column 11, line 5; after "FIG. 4" replace the "," with --.--.

Column 12, line 64; replace "$1\times10^{-3}>K=|\partial N_F/\partial T-\partial N_{SF}\partial T|>5\times10^{-5}$" with --$1\times10^{-3}>K=|\partial N_F/\partial T-\partial N_{SF}/\partial T|>5\times10^{-5}$--.

Signed and Sealed this

Fourth Day of February, 1997

Attest:

*Attesting Officer*

BRUCE LEHMAN

*Commissioner of Patents and Trademarks*